April 17, 1951  O. KYLIN ET AL  2,549,746
HYDRAULICALLY ACTUATED TURRET INDEX MECHANISM
Filed Oct. 5, 1945  5 Sheets-Sheet 1
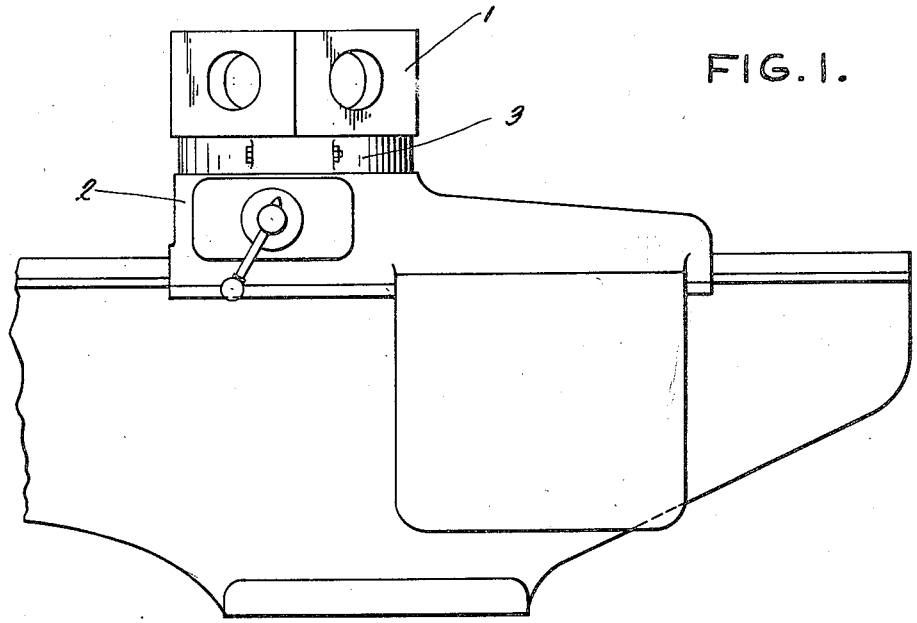
FIG. 1.
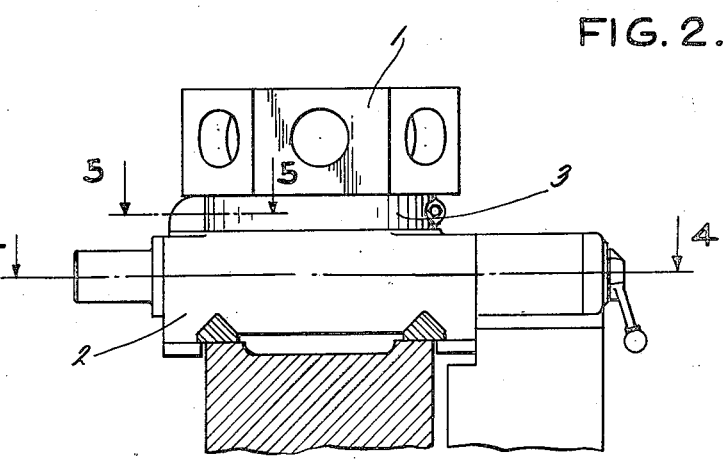
FIG. 2.
FIG. 16.
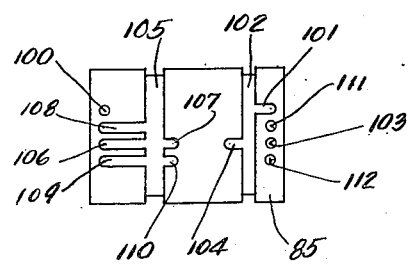
OSKAR KYLIN
HENRIK O. KYLIN
INVENTORS
BY
Haregood & Van Horn
THEIR ATTORNEYS April 17, 1951  O. KYLIN ET AL  2,549,746
HYDRAULICALLY ACTUATED TURRET INDEX MECHANISM
Filed Oct. 5, 1945  5 Sheets-Sheet 2

OSKAR KYLIN
HENRIK O. KYLIN
INVENTORS

BY Hawgood & Van Horn
THEIR ATTORNEYS

April 17, 1951  O. KYLIN ET AL  2,549,746
HYDRAULICALLY ACTUATED TURRET INDEX MECHANISM
Filed Oct. 5, 1945  5 Sheets-Sheet 3
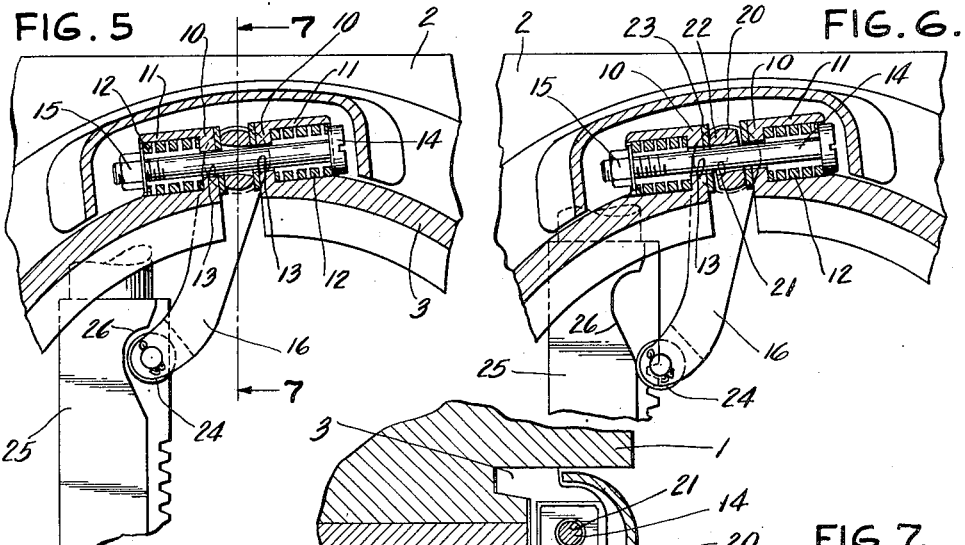
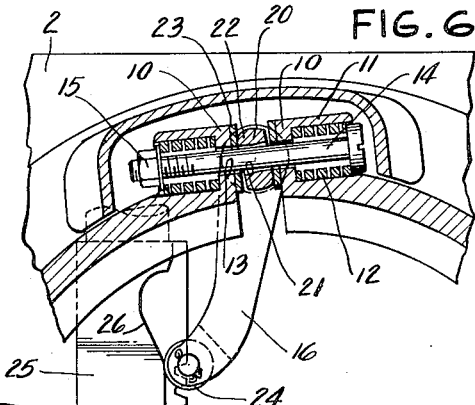
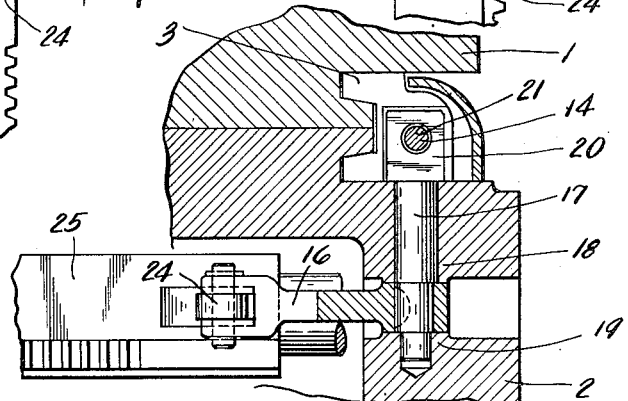
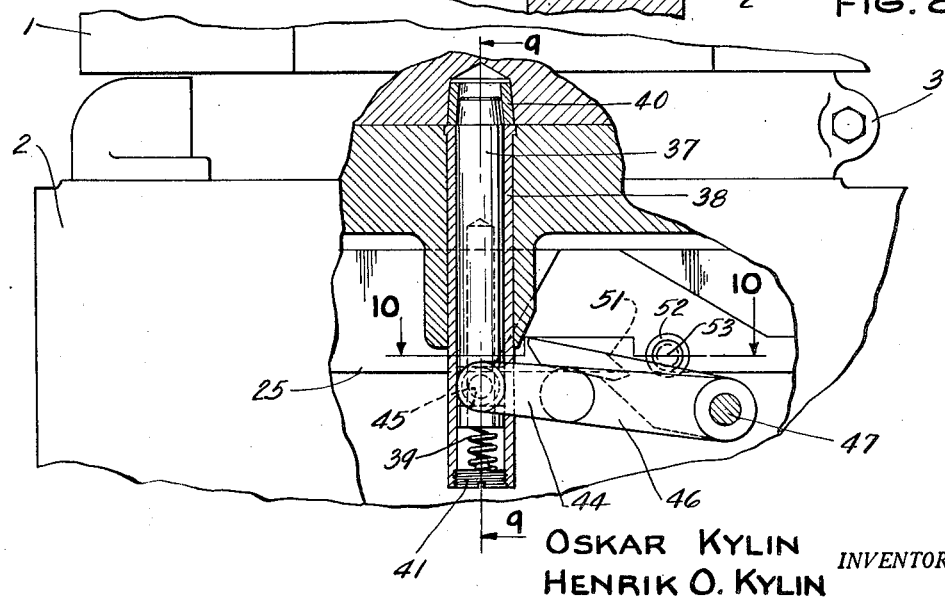
OSKAR KYLIN
HENRIK O. KYLIN
INVENTORS
BY Hawgood & Cawthorn
THEIR ATTORNEYS April 17, 1951    O. KYLIN ET AL    2,549,746
HYDRAULICALLY ACTUATED TURRET INDEX MECHANISM
Filed Oct. 5, 1945    5 Sheets-Sheet 4
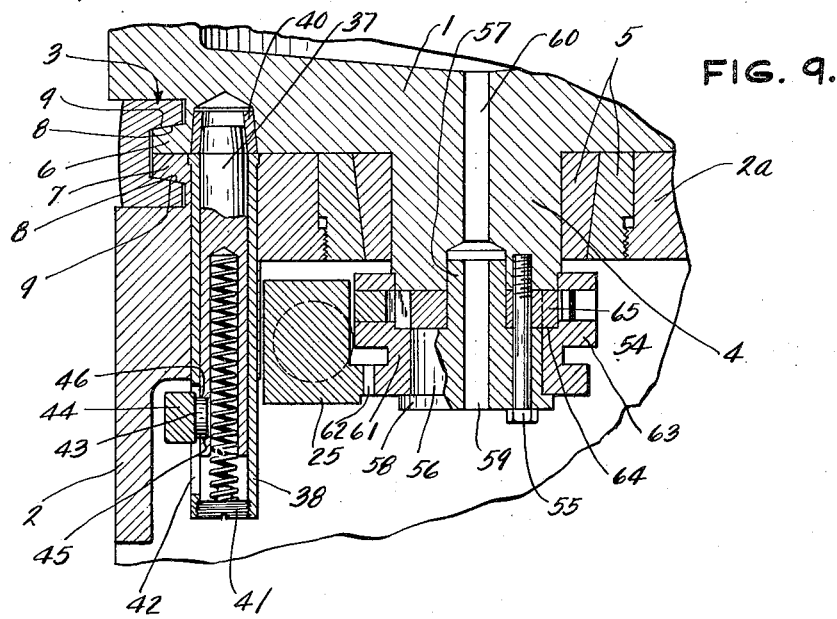
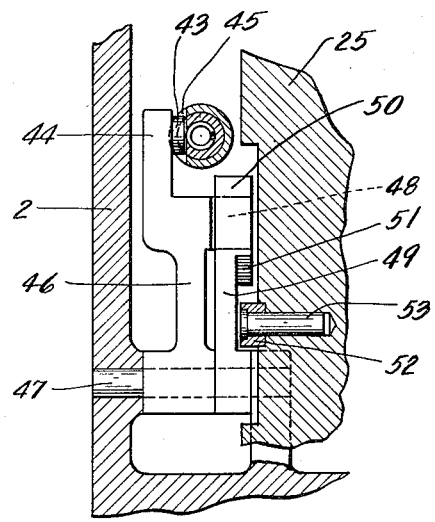
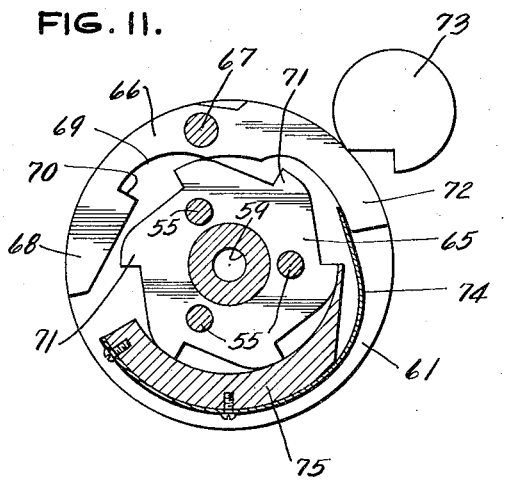
OSKAR KYLIN
HENRIK O. KYLIN  INVENTORS
BY Hawgord & Van Horn
THEIR ATTORNEYS

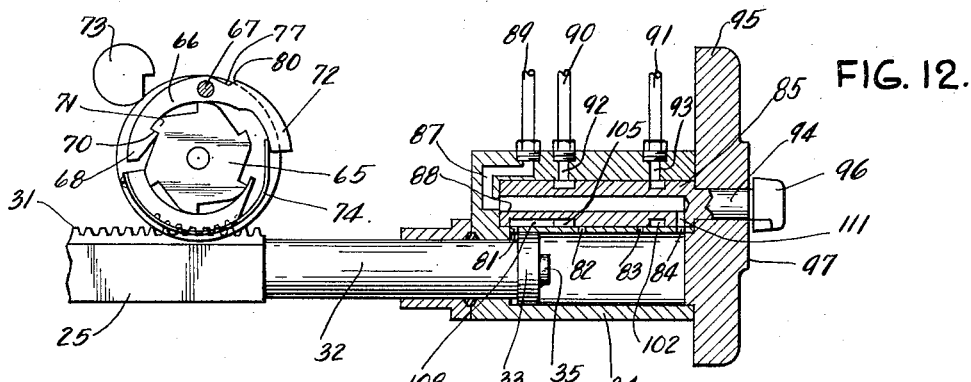

Patented Apr. 17, 1951

2,549,746

UNITED STATES PATENT OFFICE 2,549,746

HYDRAULICALLY ACTUATED TURRET INDEX MECHANISM

Oskar Kylin and Henrik O. Kylin, Cleveland Heights, Ohio, assignors to Bardons and Oliver, Inc., Cleveland, Ohio, a corporation of Ohio Application October 5, 1945, Serial No. 620,518

2 Claims. (Cl. 29—49)

Our invention relates to machine tools and more particularly to machine tools having an indexible member and to means for power indexing said member.

It is one of the objects of the present invention to provide means for power indexing an indexing member for machine tools wherein such means and the suitable selective control therefor is mounted compactly as a unit on the slide carrying the indexible member.

Another object of the invention is to provide means of the above named character which is hydraulically actuated either automatically or by hand.

A further object of the invention resides in the provision of power actuated indexing means which is extremely simple in construction and positive in operation.

A still further object of the invention includes the provision of an hydraulically operated actuator for automatically unclamping, unlocking and indexing an indexible member of a machine tool.

Another object of the invention comprises the provision of hydraulic means for indexing an indexible member of a machine tool and a selective control for said means whereby the indexible member may be hand indexed, automatically indexed, or caused to stop between two indexible positions, that is, at a corner stop.

Other objects and advantages of our invention will become more apparent as the following description of one embodiment thereof progresses, reference being made to the accompanying drawings, in which like reference characters are employed to designate like parts throughout the same.

In the drawings:

Figure 1 is a front elevation of a machine tool showing an indexible member mounted on a slide and illustrating generally the position of the control for the indexing mechanism;

Figure 2 is an end elevation of the turret slide shown in Figure 1;

Figure 5 is an enlarged section taken on the line 5—5 of Figure 2, illustrating a form of turret clamping means shown in the clamped position;

Figure 6 is a view similar to that of Figure 5, showing the clamping mechanism in turret unclamped position;

Figure 7 is a section taken on the line 7—7 of Figure 5;

Figure 8 is a fragmentary view through the base of the turret and a portion of the slide showing the locating and locking pin and the operating mechanism therefor in section;

Figure 9 is a fragmentary view partly in section showing the relative positions of the locating and locking pin, the actuator mechanism and the turret rotating ratchet;

Figure 10 is a section taken on the line 10—10 of Figure 8;

Figure 11 is a top plan view of the turret ratchet mechanism;

Figures 12, 13 and 14 illustrate the relative positions of the turret indexing mechanism and the control valve during the automatic index, the hand index, and the corner stop positions, respectively;

Figure 15 is a front view of the control valve showing the several selective positions of the valve comprising the cycle of operation of the mechanism; and, Figure 16 is a developed view of the control valve.

Figure 3:
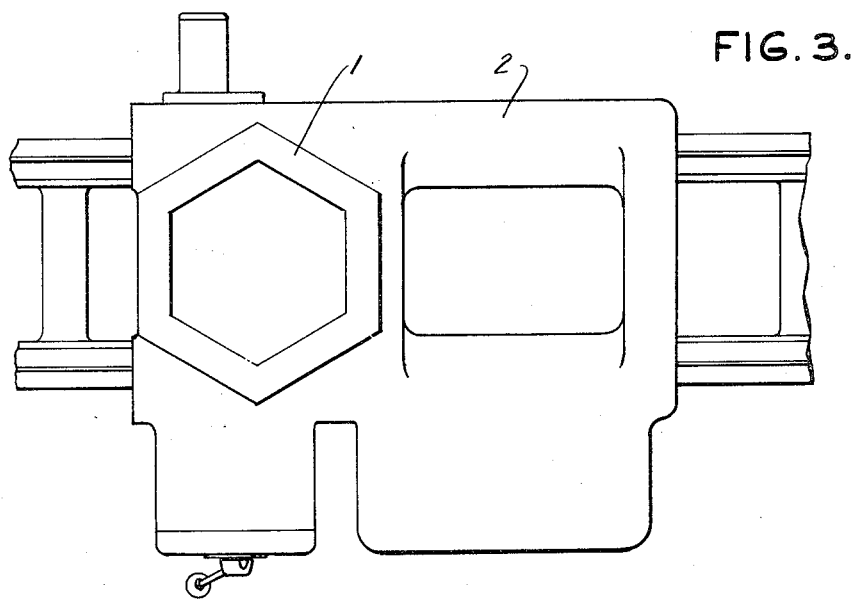
Figure 3 is a top plan view of the mechanism shown in Figures 1 and 2.

Referring now more particularly to the several figures of the drawings, a tool turret 1 is rotatably mounted in the saddle 2 and is adapted by suitable mechanism to be clamped on the support in any one of its rotative positions by means of a clamping ring 3.

The invention includes power operated means, preferably hydraulic, for clamping and unclamping the turret on its saddle in a selected rotative position, together with turret locating and locking mechanism, all of which may be actuated through a single control valve conveniently located on the saddle. In accordance with the present invention, provision is also made for moving the turret to a corner stop, that is, to a position substantially midway between two adjacent tool stations.

The turret 1 is rotatably carried on a support 2a on the saddle 2 by means of an axially projecting portion 4 operable in a suitable bearing 5. The turret base and the support 2a are grooved peripherally to provide annular flanges 6 and 7, respectively, and upper and lower surfaces of the respective flanges converging outwardly and adapted to be engaged by similarly inclined internal walls 9 of the channeled clamping ring 3, so that when the ring, which is separated radially at one point, is contracted, the surfaces 9 will slide radially upon the surfaces 8 tending to clamp the turret in place. When the ring is expanded or loosened the binding action of the walls is released and the turret is unclamped and capable of free rotation in either direction.

As illustrated in Figures 5 and 6, the ends of the ring defining the separation circumferentially, terminate in lugs 10 each having projecting portions 11 extending rearwardly of the separation to house the compression springs 12. Each of the lugs 10 is provided with aligned openings 13 through which the tie bolt 14 passes. This bolt also passes axially through the springs 12, the head of the bolt engaging the outer end of one spring and the nut and washer 15 engaging the outer end of the other spring. The compression of the springs may be terminated by adjusting the nut 15.

In order that the ring may be expanded to unclamp the turret on the saddle, we have provided a lever 16, keyed to a shaft 17 rotatably supported in the turret support at 18 and 19. The outer end of the shaft terminates in a spreader member 20 having an enlarged opening 21 through which the tie bolt loosely passes. It will be noted in Figure 5 that when the lever 16 is in the position shown, the member 20 will assume a position normal to the axis of the bolt 14, allowing the compression forces of the spring 12 to contract the ring and thus clamp the turret, but when the lever is moved to a position indicated at Figure 6 the member 20 will be swung to the position there shown, and its rounded bearing edges 22 will ride upon the bearing plates 23 on the lugs to expand the ring and unclamp the turret.

The lower end of the lever 16 carries a roller 24 for rolling engagement along a surface of the slide bar 25 and the notch 26 formed therein. The lever is normally urged toward the bar and into the depressions of the notch 26 by the compression of springs 12 acting to contract the ring 3 and to return the member 20 to a position normal to the axis of the tie bolt 14 as shown in Figure 5.

Figure 4:
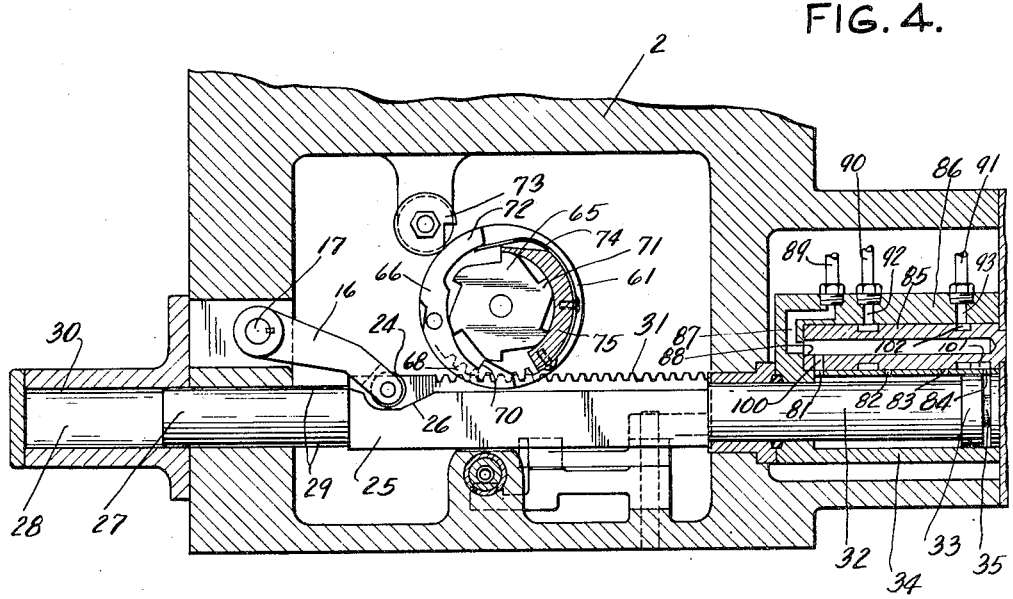
Figure 4 is a section taken on the line 4—4 of Figure 2, illustrating the power operated actuator and the mechanism for unclamping, unlocking and indexing the indexible member together with a suitable hydraulic control means for the same.

The bar 25 is slidable longitudinally and is supported at its ends in the saddle as shown more clearly in Figure 4. One end 27 of the bar 25 is of slightly reduced diameter and is preferably circular in cross section as shown in Figure 4. This end of the bar slidably operates in the cylinder 28 and is provided with longitudinally extending keyways 29 for receiving the key 30 carried by the inner wall of the cylinder 28. By this construction, the bar is prevented from rotational movement with respect to the saddle during its sliding movement in either direction. The intermediate body portion of the bar 25 is preferably of rectangular cross section and is provided along one side surface with a rack 31 preferably formed integral with the actuator bar.

The opposite end of the actuator bar is in the form of a plunger 32 having a plunger head 33 fitted within the hydraulic cylinder 34 for sliding movement therein. The head 33 is closely fitted within the cylinder 34 to prevent leakage of fluid past the head in either direction, while at the same time permitting freedom of movement of the plunger and the actuating bar.

An abutment 35 is formed on the end of the actuating bar carrying the plunger head 33 and is engageable with the right hand end of the hydraulic cylinder as viewed in Figure 4 when the bar is in full retracted position. This abutment acts as a stop and also spaces the head 33 from the right hand end of the cylinder sufficiently to uncover the port 84 in the cylinder wall for purposes which will hereinafter be described.

From the foregoing, it will readily be seen that movement of the actuator bar 25 to the left in Figure 4 will cause the roller 24 on the lever 16 to travel along the inclined surface of the notch 26, thus allowing the lever 16 to swing upwardly away from the bar as is illustrated more clearly in Figure 5.

As a result of this movement, the spreader 20 will be shifted so that its diametrically opposed corners 22 will engage the bearing plates 23 carried by the ring ends to thus force and spread the ends apart against the compression of the springs 12 and thereby to expand the ring to unclamp the turret. Movement of the actuator bar 25 to the right from the position just described will allow the roller to roll down the inclined wall of the notch 26 and return the lever 16 to the position shown in Figure 5, relieving the spreading action on the ring ends and the compression of the springs 12 to contract the ring and thereby to clamp the turret on its support.

We have also provided means associated with the bar 25 by which the position of the turret may accurately be located at each of its tool operating positions when indexing and when located at the desired position the turret may be locked in that indexed position until such time as the turret is to be unclamped and indexed to another operative position.

Referring now more particularly to Figures 4, 8, 9 and 10, the mechanism for actuating the locating pin comprises means carried by the saddle having portions in the path of movement of the actuator bar 25 and cooperable therewith to retract the normally projected locating pin 37 in response to a pre-determined movement of the actuator bar 25. The locating pin 37 is mounted for sliding movement in a sleeve 38 and is normally projected by the compression spring 39 to enter one of the locating bushings 40 formed in the turret base when those recesses are selectively aligned with the sleeve 38 as in indexing the turret to a preselected tool operating position.

The compression of the spring 39 may be adjusted by turning the adjusting nut 41 carried in the lower end of the sleeve 38, there being a slot 42 in the sleeve through which a stud 43 projects into a recess 46 formed in the pin as shown in Figures 9 and 10, and engages the surfaces 45 of the recess during movement of the pin in either direction.

The arm 44 is a part of the lever 46 which is pivotally carried on a pin 47 mounted in the saddle. The lever 46 is also provided with a transversely extending portion 48, forming a rest or stop for the outer end of the lever 49 which is also pivotally mounted on the pin 47. The end portion 50 of the lever 49 overlies the stop 48 as shown more particularly in Figure 10 and is provided rearwardly with an inclined wall 51, which is located in the path of movement of a roller 52 carried by the pin 53 mounted in one face of the actuator bar 25. As the actuator bar is moved forwardly (that is, upwardly in Figure 10) the roller 52 will approach and engage the lower portion of the inclined surface 51 and further movement of the bar 25 will cause the lever 49 and its head portion 50 to be thrust against the stop 48 carried by the lever 46, thus depressing the arm 44 in Figure 8 and retracting the locating pin 37 against the compression of the spring 39 to a position out of the path of movement of the turret, which may then be indexed.

When the actuator bar is retracted to the position shown in Figure 10, the compression of the spring 39 is such that it will urge the pin 37 upwardly to seek seating engagement with one of the locating recesses 40 in the turret when said recess is brought into alignment with the sleeve 38, as in indexing the turret. When these parts are in alignment, the locating pin will be thrust upwardly by the spring 39 into seating relation to the recess 40 and the lever 44 will likewise be thrust upwardly in Figure 8.

The inclined surface 51 being disengaged from the roller 52 by retraction of the actuator bar 25, the levers 46 and 49 will be returned to their uppermost position with the upward movement of the locating pin.

The turret may be indexed by suitable indexing mechanism engageable with and operable by the actuator bar 25. In the present form of the invention, as illustrated in the drawings and particularly in Figures 4, 9, and 11 to 14, inclusive, an indexing ratchet mechanism indicated generally at 54 in Figure 9 is secured to and is carried by the downwardly projecting portion 4 of the turret by means of the bolts 55 carried in the support 56. The support 56 has an upper portion 57 of reduced diameter and a lower outwardly extending flanged portion 58, there being an axial bore 59 therethrough communicating with the axial bore 60 of the turret to permit the drainage of lubricant and metal particles therethrough.

Rotatably carried on the body 56 is a ring 61 having its lower portion resting on the annular flange 58 and having a segment of its lower periphery formed with gear teeth 62 which are adapted to mesh with the teeth of the rack 31 formed on one side of the actuator bar 25, so that when the bar is reciprocated, the ring will be oscillated on the support in one direction or the other in response to movement of the bar 25. The upper portion of the ring 61 comprises an annular support 63 having an annular recessed portion 64 on its upper face in alignment with the upper face of the body 56 for accommodating thereon the ratchet wheel 65.

It will be noted that the bolts 55 which secure the body 56 to the base of the turret also pass through the ratchet wheel 65 and bind the same in position to move with these parts. A dog 66 is pivotally supported at 67 on the support 63 and comprises an arm 68 having a head portion relieved rearwardly at 69 and provided with a ratchet tooth engaging surface 70 which may be engaged by one of the ratchet teeth 71 when relative movement between the ratchet wheel 65 and the ring 61 is such as to permit a tooth 71 to enter the relieved portion 69 of the dog and to engage with the surface 70 thereof and when the rearward arm 72 of the dog is out of engagement with the stop 73 carried by a wall of the saddle compartment housing the ratchet and the actuator mechanism. The dog 66 is normally urged in a counter-clockwise direction in Figure 11 by means of a spring 74 carried by the member 75 on the ring 61, the spring extending under the inner wall of the dog to exert an outward pressure thereon.

The movement of the dog 66 by means of the compression of the spring 74 is illustrated more clearly in Figures 12 and 14 in which cases the rearward arm 72 of the dog is out of position to be engaged by the stop 73 due to the rotated position of the ratchet mechanism in response to the movement of the actuator bar 25.

Movement of the actuator bar from a neutral position, as shown in Figure 4 to the left will cause the indexing ratchet to rotate in a clockwise movement to the several selected positions as represented in Figures 12, 13 and 14 wherein the relative positions of the parts are such as to automatically index, hand index and corner stop the turret, respectively.

Referring more particularly to these figures, it will be seen that with the parts as shown in the neutral position as in Figure 4, the turret is clamped and locked in its indexed position.

As the actuator bar 25 is moved from the position shown in Figure 4 to the left, it will rotate the indexing ratchet to the several positions indicated. When the actuator bar is moved to the position shown in Figure 13, the indexing ratchet is rotated in a clockwise direction to the position shown, the stop 73 being in engagement with the rear arm 72 of the dog 66, thus preventing spring 74 from swinging the dog outwardly of the ratchet wheel. In this position, the turret may be hand indexed since the actuator bar has, in assuming this position, advanced sufficiently to unclamp the turret such as is indicated in Figure 6, and has at the same time caused the locking pin 37 to be retracted from the seat 40.

It will be seen from Figure 13 that the indexing ratchet wheel 65 is, therefore, free to rotate with the turret between the dog 66 and the spring carrying member 75, the surface 70 of the dog being out of the path of movement of the rotating ratchet wheel 65.

As the ratchet bar 25 approaches the next position as indicated in Figure 14, which is a position approximately midway between hand indexing and automatic indexing positions of the bar, the ratchet ring 61 is further rotated in a clockwise direction until it is in the position shown in Figure 14, that is, the pin 67 pivotally carrying the dog 66 is to the right of the stop 73, thereby permitting the spring 74 to exert its forces of compression outwardly against the arm 72 and thereby move the dog, so that the latch surface 70 is brought into engagement with the flat face 76 of one of the ratchet teeth 71.

In order to permit an interlocking engagement between the dog and the ratchet tooth 71 at the beginning of the movement of the actuator bar 25 from the position in Figure 13, the dog is notched along its outer surface as at 77 preferably at a point adjacent the pin 67 as shown in the drawing. The notch 77 is formed by two walls converging inwardly from the outer surface of the dog. When the ratchet device 54 is rotated in a clockwise direction from the position of Figure 13 to that shown in Figure 14 a slight rotary movement occurs before the abutting surfaces of the stop 73 rides off the outer surface of the arm 72 and opposite the notch 77.

This will permit the dog to pivot in a counter-clockwise direction to bring the surface 70 into position to engage the flat surface 76 of an adjacent ratchet tooth. Continued rotation of the ratchet device in the clockwise direction will bring about such engagement and will interlock the ring 61 with the ratchet wheel 65 and cause the turret to be rotated on the saddle a distance corresponding to the movement of the actuator bar 25 which in Figure 14 is shown as a position substantially midway between the hand indexing position and the automatic indexing position shown in Figure 12. This intermediate position will thus correspond to what is known as a corner stop position, that is, a position in which the corner formed by two adjacent faces of the turret will have assumed a position directly in alignment with the turning axis of the spindle of the machine. In such position, it will be understood that the turret is neither clamped nor locked, since the clamping ring will remain expanded and the locating and locking pin 37 will be out of register with the locating bushings.

As the actuator bar is advanced from the position shown in Figure 14, to that shown in Figure 12, the *turret* will be rotated past the corner stop position just reached to a full indexed position, since the dog is still in engagement with the ratchet tooth 71 due to the forces of compression of the spring 74. When the tool is thus fully indexed, the locking or locating pin 37 is brought into register with the corresponding locating bushing 40 and is allowed to be projected thereinto to lock the turret in the indexed position.

When the actuator bar is withdrawn to the right in Figures 12, 13 and 14 by suitable means to be described hereinafter, the ratchet mechanism will be rotated in a counter-clockwise direction, the dog riding over the back surface of the adjacent tooth of the ratchet, and when the notched portion 77 of the dog 66 passes beyond the stop 73 the engagement of the stop with the inclined surface 80 of the notch will cause the dog 66 to again be moved to its retracted position as shown in Figure 13 against the compression of the spring 74.

When the actuator bar is fully returned to its right hand position, as shown in Figure 4, the mechanism will be in neutral position, that is, the turret clamping ring will be retracted to clamp the turret on the saddle and the locking pin 37 will be seated in its corresponding locating bushing 40.

We have provided power means for operating the actuating bar 25 to the several positions described herein and have also provided a selective control comprising a pressure fluid distributing valve conveniently located on the saddle of the machine.

As shown in Figures 4, 12, 13 and 14, the actuator bar 25 is provided with a portion comprising a plunger 32 which is adapted to reciprocate in the fluid pressure cylinder 34, the plunger having a head 33 for sliding movement within the cylinder. The cylinder 34 is provided with a series of ports 81, 82, 83 and 84 for communication with a control valve 85 rotatably mounted in the casing 86 immediately above the cylinder 34.

The casing 86 is provided with a duct 87 which communicates with the axial bore 88 of the control valve and with a pipe 89 to convey fluid pressure to the valve from a suitable source of supply. Pipes 90 and 91 are connected to the ducts 92 and 93, respectively, for the purpose of exhausting pressure fluid from the cylinder 34 through selected ports in the control valve 85. The control valve comprises a main body portion 85 having a forward valve stem 94 which extends through the wall 95 of the saddle and to which is secured an opening handle 96 movable over the face 97 of the wall 95.

As shown in Figure 15, various positions of the valve are indicated on the surface 97, there being detents 98 for each position of the valve, the valve handle 96 carries a spring urged ball in position to engage the detents as the valve handle is moved through its several positions and to indicate to the operator when the selected position has been reached. Stops 99 are provided to limit the two extreme movements of the valve handle as shown in Figure 15.

We will now describe the operation of the mechanism through the several positions of the control valve beginning first with the position marked "Neutral," in which the turret is clamped and locked after having been indexed.

Pressure fluid entering the pipe 89 will travel through the duct 87 and into the axial bore 88 of the control valve 85, where it will be delivered through a port 100 in the valve and in duct 81 which is in register therewith to the cylinder 34. In this position of the valve, the ports 82 and 83 will be closed. Thus, the plunger will be forced to the extreme right as shown in Figure 4. The port 84 communicates with port 101 and duct 102 in the valve to the exhaust pipe 91.

The index position of the valve comprises actually two independent positions, one of which is labeled "Automatic Index" and the other "Hand Index." When the valve is turned to "Hand Index" position, fluid pressure will be delivered from pipe 89 and duct 87 to the axial bore 88 and thence through ports 103 and 84 to the front side of the plunger head causing the actuator bar to be moved to the left in Figure 13 until it uncovers port 83 in the cylinder wall. The port 83 is now in communication with the exhaust port 104 and duct 102 of the valve which will exhaust the fluid pressure through the duct 93 and the pipe 91. In this position of the valve, ports 82 and 81 are in communication with exhaust ports 106, 107 and duct 105 in the valve which is also opened to exhaust through the duct 92 and the pipe 90. When the valve is turned to "Automatic Index" position which is represented in Figure 12, the actuator bar and plunger will be moved to the extreme left hand position in this figure, fluid pressure entering the cylinder 34 through the ports 111 and 84, the ports 82 and 83 being closed while port 81 is now in communication with exhaust port 108 and the duct 105 which in turn is in communication with the exhaust port 92 and the pipe 90.

When it is desired to move the turret to the "Corner Stop" position, the valve 85 is shifted to that position as indicated on the surface 97. The corner stop position of the valve is further illustrated in Figure 14 wherein fluid pressure will enter the cylinder 34 through ports 84 and 112, the port 83 being closed and ports 81 and 82 being in communication with exhaust ports 109 and 110 and the duct 105 to exhaust the fluid pressure through the exhaust port 92 and then the port 90.

We claim:

1. In a machine tool having a part to be indexed and a support for said part, means for clamping and unclamping said part on the support, means for locating and locking said part on said support, means for indexing said part, and power actuated mechanism selectively operable to sequentially unclamp, unlock, index, lock and clamp said movable part on the support, said mechanism being selectively movable to index said part to a position intermediate any two adjacent normal indexing stations, said mechanism comprising a ratchet device carried by said part, said ratchet device comprising a ratchet wheel fixed to rotate with said part to be indexed, a ring relatively rotatable on and carried by said ratchet device, a dog pivotally carried by said ring and having a toothed arm for engagement with the ratchet wheel and a second arm and a spring in said ring engaging said second arm for normally urging said toothed arm into engagement with said wheel, an actuator having driving connection with said ring, a hydraulic cylinder, an end of said actuator operable in said cylinder in response to the admission and discharge of fluid pressure therein, a source of fluid pressure, a single control valve for controlling said pressure to and from said cylinder to select the stroke of said actuator, a stop member carried by said support and positioned in close proximity to said ring and adapted to be engaged by said second arm when said ring is rotated to a position where said second arm lies between said stop and said ratchet wheel.

2. In a machine tool having a part to be indexed and a support for said part, means for clamping and unclamping said part on the support, means for locating and locking said part on said support, means for indexing said part, and power actuated mechanism selectively operable to sequentially unclamp, unlock, index, lock and clamp said movable part on the support, said mechanism being selectively movable to index said part to a position intermediate any two adjacent normal indexing stations, said mechanism comprising a ratchet device carried by said part, said ratchet device comprising a ratchet wheel fixed to rotate with said part to be indexed, a ring relatively rotatable on and carried by said ratchet device, a dog pivotally carried by said ring and having a toothed arm for engagement with the ratchet wheel and a second arm and a spring in said ring engaging said second arm for normally urging said toothed arm into engagement with said wheel, an actuator having driving connection with said ring, a hydraulic cylinder, an end of said actuator operable in said cylinder in response to the admission and discharge of fluid pressure therein, a source of fluid pressure, a single control valve for controlling said pressure to and from said cylinder to select the stroke of said actuator, a stop member carried by said support and positioned in close proximity to said ring and adapted to be engaged by said second arm when said ring is rotated to a position where said second arm lies between said stop and said ratchet wheel, an arm carried by said clamping and unclamping means and having engagement with the other end of said actuator whereupon movement of the actuator in one direction will actuate said arm to unclamp said part while movement of said actuator in an opposite direction will actuate said arm to clamp said part.

OSKAR KYLIN.
HENRIK O. KYLIN.

REFERENCES CITED

The following references are of record in the file of this patent:

UNITED STATES PATENTS

| Number | Name | Date |
|---|---|---|
| 1,046,529 | Winton | Dec. 10, 1912 |
| 1,745,460 | Sudhoff | Feb. 4, 1930 |
| 1,942,927 | Johnson et al. | Jan. 9, 1934 |
| 2,071,786 | Ferris et al. | Feb. 23, 1937 |
| 2,094,993 | Lovely et al. | Oct. 5, 1937 |
| 2,148,779 | Senger | Feb. 28, 1939 |
| 2,417,366 | Kylin et al. | Mar. 11, 1947 |